United States Patent
Tanimoto

(10) Patent No.: US 7,283,269 B2
(45) Date of Patent: Oct. 16, 2007

(54) INTERNET FACSIMILE MACHINE

(75) Inventor: Yoshifumi Tanimoto, Hirakata (JP)

(73) Assignee: Murata Kakai Kabushiki Kaisha, Kyoto (JP)

( * ) Notice: Subject to any disclaimer, the term of this patent is extended or adjusted under 35 U.S.C. 154(b) by 1048 days.

(21) Appl. No.: 10/330,993

(22) Filed: Dec. 27, 2002

(65) Prior Publication Data

US 2003/0123100 A1    Jul. 3, 2003

(30) Foreign Application Priority Data

Dec. 28, 2001  (JP) .............................. 2001-400967
Dec. 28, 2001  (JP) .............................. 2001-400973

(51) Int. Cl.
*G06K 1/00*    (2006.01)
*H04N 1/00*    (2006.01)

(52) U.S. Cl. ..................... 358/1.15; 358/402; 358/407; 358/403

(58) Field of Classification Search ............... 358/1.15, 358/402, 407, 403, 444, 443; 379/100.09
See application file for complete search history.

(56) References Cited

U.S. PATENT DOCUMENTS 6,700,674 B1 * 3/2004 Otsuka et al. ............. 358/1.15

2002/0051221 A1 * 5/2002 Wakabayashi .............. 358/402

FOREIGN PATENT DOCUMENTS

| JP | 06-113101 | | 4/1994 |
|----|-----------|---|--------|
| JP | 06-291964 | | 10/1994 |
| JP | 07-154551 | | 6/1995 |
| JP | 08-163300 | | 6/1996 |
| JP | 10-098573 | * | 4/1998 |
| JP | 10-293734 | * | 11/1998 |
| JP | 11-205574 | | 7/1999 |
| JP | 2000-347954 | | 12/2000 |
| JP | 2001-016252 | | 1/2001 |
| JP | 2001-309109 | | 11/2001 |

* cited by examiner

*Primary Examiner*—Jerome Grant, II
*Assistant Examiner*—Houshang Safaipour
(74) *Attorney, Agent, or Firm*—Hogan & Hartson LLP

(57) ABSTRACT

An Internet facsimile machine includes a control unit controlling to transmit image data by using an electronic mail message after storing original image data in a storage unit and to retransmit a first electronic mail message, when transmitting the first electronic mail message including simplified image data, and a return electronic email message cannot be received even after an elapsed prescribed period of time.

23 Claims, 10 Drawing Sheets

INTERNET FACSIMILE MACHINE

FIELD OF THE INVENTION

The present invention relates to a full-mode Internet facsimile machine that transmits an image data by using electronic mail.

DESCRIPTION OF THE RELATED ART

FIG. 2 is a sequence diagram showing a communication procedure between full-mode Internet facsimile machines 20A, 20B of a related art.

In the full-mode Internet facsimile machine that transmits image data by using electronic mail via the Internet, as shown in FIG. 2, during an initial communication procedure, the transmitting Internet facsimile machine 20A scans an image of a document image under its maximum ability condition, or under an ability condition designated by a user. Then, Internet facsimile machine 20A stores the scanned document image in an image memory as an original image data, and forms a simplified image data with a resolution lower than that of the original image data. Next, Internet facsimile machine 20A transmits a first electronic mail message including the simplified image data and format information of the original image data, to receiving Internet facsimile machine 20B via the Internet. In response to the first electronic mail message from Internet facsimile machine 20A, Internet facsimile machine 20B returns an electronic mail message including its ability information (information such as a file format of the image data, a processable resolution and its horizontal to vertical ratio, an image encoding method, and information of the width of the printing paper size) and an image data request to Internet facsimile machine 20A via the Internet. Then, during the communication procedure of a second time and afterwards, Internet facsimile machine 20A forms an image data corresponding to the ability information from the original image data stored in the image memory, in accordance with the received ability information of facsimile machine 20B. In addition, Internet facsimile machine 20A transmits an electronic mail message including the image data to Internet facsimile machine 20B via the Internet. In response to the electronic mail message from Internet facsimile machine 20A, when receiving the electronic mail message normally, Internet facsimile machine 20B returns an electronic mail message including a delivery confirmation of "OK" to Internet facsimile machine 20A. Moreover, when receiving the electronic mail message abnormally, Internet facsimile machine 20B returns an electronic mail message including a delivery confirmation of "NG" to Internet facsimile machine 20A.

In the above-described communication procedure for the full-mode Internet facsimile, it is necessary for Internet facsimile machine 20A to store the original image data in the image memory until receiving the electronic mail message including the ability information of Internet facsimile machine 20B and the image data request. However, as a first problem, when a storage-period becomes long, a storage field in the image memory is pressured, which affects other communications.

Moreover, as a second problem, even after the transmission of the image data during the communication procedure of the second time, it was necessary to store the original image data in the image memory until receiving the delivery confirmation of "OK". Which also leads to the storage field in the image memory being pressured which affects other communications.

Furthermore, as a third problem, even when the original image data is erased from the image memory for some reasons, such as a power source being shut off, an abnormality in the memory, or deletion by a user by mistake, an appropriate processing cannot be executed.

SUMMARY OF THE INVENTION

A first advantage of the present invention is to solve the above first and second problems, and to provide an Internet facsimile machine that can shorten as much as possible a storage period for storing the original image data in the image memory.

A second advantage of the present invention is to solve the above third problem, and to provide an Internet facsimile machine that can execute an appropriate processing automatically when the original image data has been erased.

According to the first advantage, the Internet facsimile machine relating to the present invention is a full-mode Internet facsimile machine that stores the original image data in a storage unit, and then transmits the image data by using electronic mail. After transmitting a first electronic mail message including simplified image data, when a return electronic mail message cannot be received by a remote receiving device even after an elapsed prescribed period of time, a control unit provided within the Internet facsimile machine controls to retransmit the first electronic mail message. Therefore, by retransmitting the first electronic mail message, even when the first electronic mail message transmitted is undelivered, a return mail message can be expected. Accordingly, there is a possibility to shorten the storage period when the original image data is stored in the image memory.

Moreover, according to the first advantage, the Internet facsimile machine relating to the present invention is a full-mode Internet facsimile machine that stores the original image data in a storage unit, and then transmits the image data by using electronic mail. After transmitting a second electronic mail message including image data corresponding to the ability information of a destination, when a return electronic mail message cannot be received even after an elapsed prescribed period of time, a control unit provided within the Internet facsimile machine controls to retransmit the second electronic mail message. Therefore, by retransmitting the second electronic mail message including the image data corresponding to the ability information of the destination, even when the second electronic mail message transmitted at first is undelivered, a return mail message can be expected. Accordingly, there is a possibility to shorten the storage period when the original image data is stored in the image memory.

In the above-described, each Internet facsimile machine, when the return electronic mail message cannot be received even by retransmitting the electronic mail message for a prescribed number of times, the control unit is preferable to delete the original image data stored in the storage unit. When the original image data is deleted, the control unit is preferable to print out such a fact. Alternatively, when the original image data is deleted, the control unit is preferable to record such a fact in a communication management record. Therefore, when the return electronic mail message cannot be received even by retransmitting the electronic mail message, since the original image data is deleted, the storage field of the Internet facsimile machine is not continuously pressured, and the storage period when the original image data is stored in the image memory can be shortened. Even when the original image data is deleted, since such a fact is recorded as a deletion report or a communication management record, the user operating the transmitter can be aware of the fact.

Moreover, in the above-described, each Internet facsimile machine, when the return electronic mail message cannot be received even by retransmitting the electronic mail message for a prescribed number of times, the control unit is preferable to output a fact that a transmission error has occurred. Therefore, when the return electronic mail message cannot be received even by retransmitting the electronic mail message, since such a fact is recorded as a transmission error report, the user at the transmitter can be aware of the fact.

According to the second advantage, the Internet facsimile machine relating to the present invention is a full-mode Internet facsimile machine that stores the original image data in a storage unit, and then transmits the image data by using an electronic mail message. The Internet facsimile machine includes a detecting unit detecting that the original image data is erased from the storage unit. In addition, the Internet facsimile machine includes a controls unit controlling to execute a prescribed notification processing when the erasure of the original image data is detected. Therefore, when the original image data has been erased, an appropriate processing can be executed automatically. In addition, in accordance with the notification of the erasure, the user can take appropriate measures at the transmitter and the receiver. Especially by the notification to the receiver, a reason for an interruption of the communication can be learned, and the user at the receiver can take appropriate measures.

In the above-described Internet facsimile machine, the detecting unit is preferable to detect that the original image data has been erased from the storage unit under a prescribed timing. In addition, the prescribed timing is a timing after the transmission of the first electronic mail message including the simplified image data. Moreover, the prescribed timing is a timing attempting to transmit the second electronic mail message including the image data corresponding to a received ability information, after transmitting the first electronic mail message including the simplified image data and receiving the electronic mail message including the image data request requesting the image data corresponding to the prescribed ability information. Therefore, when the original image data has been erased, an appropriate processing can be executed automatically under an appropriate timing. In addition, in accordance with the notification of the erasure, the user can take appropriate measures at the transmitter and the receiver.

Moreover, according to the second advantage, the Internet facsimile machine relating to the present invention is a full-mode Internet facsimile machine that stores the original image data in a storage unit, and then transmits the image data by using electronic mail. The Internet facsimile machine includes a control unit selectively setting and executing a first operation mode and a second operation mode. Further, the first operation mode detects the erasure of the original image data from the storage unit at all times, and when detecting the erasure of the original image data, executes a prescribed notification processing. The second operation mode detects the erasure of the original image data from the storage under a prescribed timing, and when detecting the erasure of the original image data, executes a prescribed notification processing. In this case, when the original image data has been erased, an appropriate processing can be executed automatically, for example, for each facsimile communication or for each destination. In addition, in accordance with the notification of the erasure, the user can take appropriate measures at the transmitter and the receiver. Especially by the notification to the receiver, a reason for an interruption of the communication can be learned, and the user at the receiver can take appropriate measures.

In the above-described Internet facsimile machine, the notification processing is to notify that the erasure of the original image data is detected to a destination by using electronic mail. Moreover, the notification processing is to record that the erasure of the original image data is detected in a communication management record. In addition, the notification processing is to notify that the erasure of the original image data is detected by printing out a report.

Furthermore, according to the second advantage, the Internet facsimile machine relating to the present invention is a full-mode Internet facsimile machine that stores the original image data in a storage unit, and then transmits the image data by using electronic mail. The Internet facsimile machine includes a detecting unit and a control unit. Further, after transmitting the first electronic mail message including simplified image data, when receiving the electronic mail message that does not request the image data corresponding to the prescribed ability information (for example, when receiving the electronic mail message indicating a delivery confirmation from a destination that received the first electronic mail message including the simplified image data), the detecting unit detects that the original image data has been erased. The control unit controls to execute a processing not to make as an abnormality in the transmission completion, in other words, a processing to process as the transmission has completed normally, when the erasure of the original image data has been detected. Therefore, in this case, it is not necessary to execute an error processing, the processing can be ended normally, and unnecessary processing is not executed.

DETAILED DESCRIPTION OF THE PREFERRED EMBODIMENTS

Embodiments of the present invention will be described with reference to accompanying drawings.

First Embodiment

Figure 1:
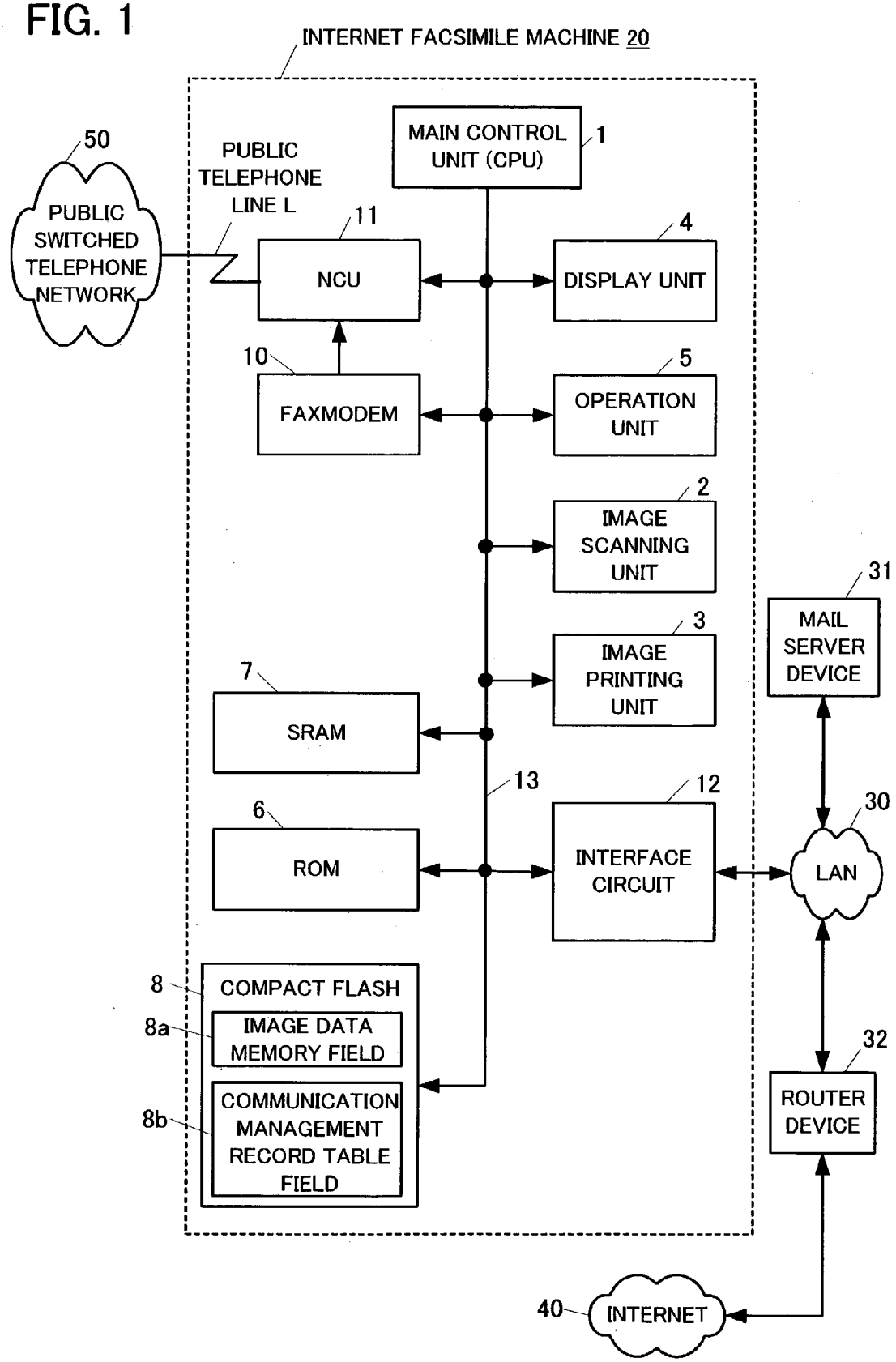
FIG. 1 is a block diagram showing a configuration of an Internet facsimile machine 20 according to first and second embodiments of the present invention.

FIG. 1 is a block diagram showing a configuration of an Internet facsimile machine 20 according to an embodiment of the present invention.

The Internet facsimile machine 20 of the first embodiment is a full-mode Internet facsimile machine that stores an original image data in an image data memory field 8a in a memory device 8 such as a CompactFlash (CompactFlash is a registered trademark of SanDisk Corp. of Santa Clara, Calif.), and transmits image data by using electronic mail via Internet 40. After transmitting a first electronic mail message including simplified image data (step S3 in FIG. 3), when a return electronic mail message cannot be received even after an elapsed prescribed period of time (NO in step S4 and YES in step S5), a main control unit 1 controls to retransmit the first electronic mail message (step S3).

In addition, after transmitting a second electronic mail message including the image data corresponding to the ability information of the receiver (step S41 in FIG. 6), when the return electronic mail message cannot be received even after an elapsed prescribed period of time (NO in step S42 and YES in step S43), the main control unit 1 controls to retransmit the second electronic mail message (step S41).

Figure 4:
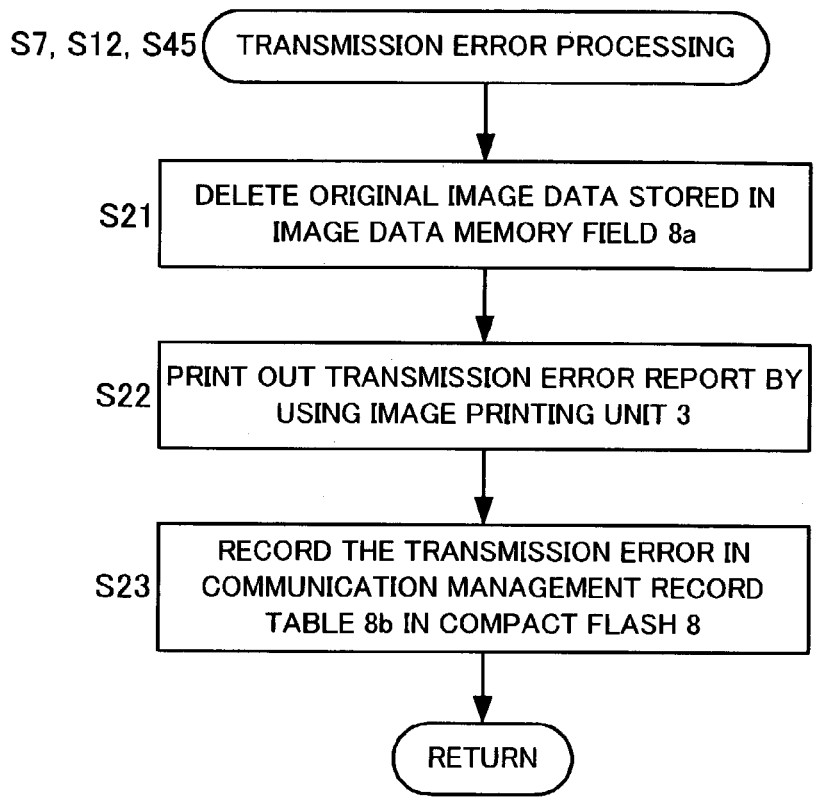
FIG. 4 is a flowchart showing a transmission error processing (S7, S12, S45) which is a subroutine of FIG. 3 and FIG. 6.

Furthermore, when the return electronic mail message cannot be received even by retransmitting the electronic mail message for a prescribed number of times, the main control unit 1 executes a transmission error processing of step S7 or step S45 to delete the original image data stored in the image data memory field 8a in the memory device 8 (step S21 in FIG. 4). In the transmission error processing, when the original image data has been deleted, the main control unit 1 prints out such a fact (step S22), or records such a fact in a communication management record (step S23).

In addition, when the return electronic mail message cannot be received even by retransmitting the electronic mail message for a prescribed number of times, the main control unit 1 prints out a fact that a transmission error has occurred as a transmission error report (step S22 in FIG. 4).

Figure 2:
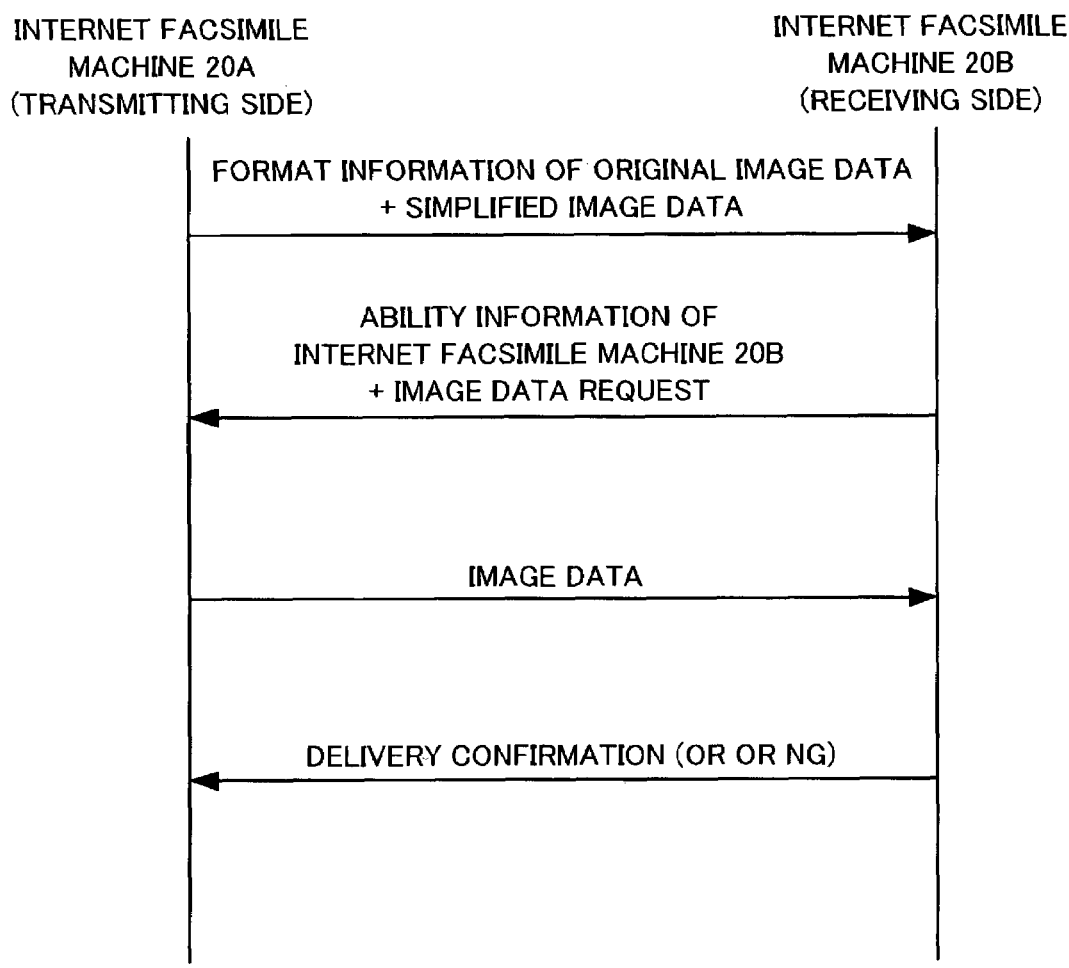
FIG. 2 is a sequence diagram showing a communication procedure between a full-mode Internet facsimile machine 20A and a full-mode Internet facsimile machine 20B of the related art.

In FIG. 1, the Internet facsimile machine 20 includes a facsimile communication function of a conventional G3 type or the like, and a full-mode Internet facsimile function having the communication procedure of FIG. 2. The main control unit 1 is formed of a CPU (Central Processing Unit) specifically. The main control unit 1 is connected to each of the following hardware parts via a bus 13, and controls the hardware parts. In addition, the main control unit 1 executes various functions of software to be described later on. An image scanning unit 2 scans a document by a scanner using CCD (Charged Coupled Device) or the like, and outputs a dotted image data converted into a binary of black and white. An image printing unit 3 is an electro-photographic typed printer or the like, and prints out to record the image data, which is received by the facsimile communication from another facsimile machine, as a hard copy. A display 4 is a displaying device such as a liquid crystal display (LCD) or CRT (Cathode Ray Tube) display. The display 4 displays an operation status of the Internet facsimile machine 20, or displays an image data of a document to be transmitted, and a received image data.

An operation unit 5 includes letter keys, ten-key numeric pad for dialing, speed-dial keys, one-touch dial keys, various function keys or the like that are necessary for operating the Internet facsimile machine 20. Further, by forming the display 4 as a touch panel, a part or all of the various keys in the operation unit 5 can be substituted.

ROM (Read Only Memory) 6 stores various software programs that are necessary for an operation of the Internet facsimile machine 20 and that are executed by the main control unit 1. The programs include at least a program of a full-mode Internet facsimile transmission processing shown in FIG. 3 through FIG. 6. Moreover, the programs can be recorded in a recording medium such as a floppy disk, MO (Magneto-Optic) disk, or DVD-RAM (Digital Versatile Disk-Random Access Memory). The programs can be loaded to SRAM (Static Random Access Memory) 7 via the drive device when necessary, and the program can be executed. The SRAM 7 is used as a working area of the main control unit 1, and stores temporally data that generates when the program is executed. In addition, the memory device 8 includes the image data memory field 8a that stores the image data, and a communication management record table field 8b that is a memory field for recording a communication management record table.

A faxmodem 10 is a modem connected to a public switched telephone network (PSTN) 50 via a public telephone line L, and includes a faxmodem function for general facsimile communication. NCU (Network Control Unit) 11 is a hardware circuit that carries out closing and releasing operations of a direct current loop or the like of the analogue public telephone line L, and includes an automatic dial function. The NCU 11 connects the faxmodem 10 to the public telephone line L when necessary. Further, the NCU 11 can detect an ID receiving terminal starting signal of caller ID notification service, and a general telephone calling signal. In addition, the NCU 11 can transmit a first response signal and a second response signal in the caller ID notification service when necessary. Moreover, the NCU 11 can be connected to a digital line (for example, ISDN (Integrated Services Digital Network) line) of a base band transmission method via a prescribed terminal adaptor and DSU (Digital Service Unit).

An interface circuit 12 is a LAN (Local Area Network) interface circuit that carries out a signal conversion or a protocol conversion of a signal or data, to connect the Internet facsimile machine 20 to LAN 30 or the like such as an Ethernet. A mail server device 31 and a router device 32 are connected to the LAN 30. Furthermore, the router device 32 is connected to a mail server device of a receiver (not shown in the drawings) via the Internet 40. When transmitting the electronic mail message to another Internet facsimile machine from the Internet facsimile machine 20 after attaching the image data to a main body of an electronic mail message, the electronic mail message is transmitted to the mail server device 31 once via the LAN 30 from the interface circuit 12. Then, the mail server device 31 transmits the Internet mail to the receiving Internet facsimile machine receiver via the LAN 30, the router device 32, the Internet 40, and the receiving mail server device (not shown in the drawings). Meanwhile, when receiving an electronic mail message, the Internet facsimile machine 20 receives the electronic mail message through a path that is the reverse of the above-described path. Further, a line connection to the Internet 40 is not limited to a private line or the like, and can be a dial-up connection using the public telephone line L.

The Internet facsimile machine 20 of the first embodiment having the configuration as described above includes the facsimile communication function of the general G3 method, the Internet, or the like. The Internet facsimile machine 20 also includes an Internet facsimile function. According to the facsimile communication function, the dotted image data scanned by the image scanning unit 2 is encoded by a software in accordance with an encoding method, such as MH (Modified Huffman), MR (Modified Read), or MMR (Modified Modified Read), which are defined in a standard of the facsimile communication. Then, the encoded data is transmitted to the receiving facsimile machine. Meanwhile, the encoded data received from the receiving facsimile machine is decoded into an image data by the software, and outputs as a hardcopy from the image printing unit 3.

Next, an example of an electronic mail message will be described for the full-mode Internet facsimile transmission of the first embodiment.

First, an example of the electronic mail message for the transmission of the simplified image data is shown in Chart 1. As it is evident from Chart 1, format information of the inserted image data (information such as a file format of the image data, a resolution and its horizontal to vertical ratio, an image encoding method, and information of the width of the printing paper size), and the format information of the original image data (information such as a file format of the image data, a resolution and its horizontal to vertical ratio, an image encoding method, and information of the width of the printing paper size) are included above the inserted TIFF (Tagged Image File Format) image data.

[Chart 1]
An example of the electronic mail for the transmission of the simplified image data
Date: Wed, 20 Sep. 1995 00:18:00+0900
From: Sender@terminalA.ifax
Message-Id:<199509200019.12345@terminalA.ifax>
Subject: Internet FAX Full Mode Sample 1
To: Recipient@terminalB.ifax
Disposition-Notification-To: Sender@terminalA.ifax
Disposition-Notification-Options:
  Alternative-available=optional, permanent
MIME-Version: 1.0
Content-Type: multipart/mixed;
  boundary="RAA14128.773615765"
RAA14128.773615765
Content-type: image/tiffapplication=faxbw
Content-Transfer-Encoding: base 64
Content-features:
  (&(color=Binary)
  (image-file-structure=TIFF-minimal)
  (dpi=200)
  (dpi-xyratio=1)
  (paper-size=A4)
  (image-coding=MH)
  (MRC-mode=0)
  (ua-media=stationery))

Content-alternative:
  (&(color=Binary)
  (image-file-structure=TIFF-limited)
  (dpi=400)
  (dpi-xyratio=1)
  (paper-size=A4)
  (image-coding=MMR)
  (MRC-mode=0)
  (ua-media=stationery))
[TIFF-FX Profile-S (Image Data)]
RAA14128.773615765

Next, an example of an electronic mail message for the transmission of the image data request is shown in Chart 2. As it is evident from Chart 2, the ability information of the receiver (information such as a file format of the image data, a processable resolution and its horizontal to vertical ratio, an image encoding method, and information of the width of the printing paper size) is included at the end of the main body of the electronic mail message.

[Chart 2]
An example of the electronic mail message for the transmission of the image data request
Date: Wed, 20 Sep. 1995 00:19:00+0900
From: Recipient@terminalB.ifax
Message-Id:<199509200020.12345@terminalB.ifax>
Subject: Re: Internet Fax Full Mode Sample 1
To: Sender@terminalA.ifax
MIME-Version: 1.0
Content-Type: multipart/report;
  report-type=disposition-notification;
  boundary="RAA14128.773615766"
RAA14128.773615766
The message sent on Sep. 20, 1995 at 00:18:00+0900 to Recipient@terminalB.ifax with subject "Internet Fax Full Mode Sample 1" has been received. An alternative form of the message data is requested.
RAA14128.773615788
Content-Type: message/disposition-notification
Reporting-UA: Recipient terminalB.ifax; IFAX-FullMode
Original-Recipient: rfc822; Recipient@terminalB.ifax
Final-Recipient: rfc822; Recipient@terminalB.ifax
Original-Message-ID:<199509200019.12345@terminalA.ifax>
Disposition: automatic-action/MDN-sent-automatically; deleted/alternative-preferred
Media-Accept-Features:
  (&(color=Binary)
  (image-file-structure=TIFF)
  (|(&(dpi=200)(dpi-xyratio=200/100))
  (&(dpi=200)(dpi-xyratio=1))
  (&(dpi=400)(dpi-xyratio=1)))
  (|(image-coding=[MH,MR,MMR])
  (&(image-coding=JBIG)
  (image-coding-constraint=JBIG-T85)
  (JBIG-stripe-size=128)))
  (MRC-mode=0)
  (paper-size=[A4,B4])
  (ua-media=stationery))
RAA14128.773615766

Furthermore, an example of an electronic mail message for the second transmission of the image data is shown in Chart 3. As it is evident from Chart 3, the converted TIFF image data is inserted at the end of the electronic mail message.

[Chart 3]
An example of the electronic mail for the second transmission of the image data
Date: Wed, 20 Sep 1995 00:21:00+0900
From: Sender@terminalA.ifax
Message-Id:<199509200021.12345@terminalA.ifax>
Original-Message-Id:<199509200019.12345@terminalA.ifax>
Subject: Internet FAX Full Mode Sample 2
To: Recipient@terminalB.ifax
Disposition-Notification-To: Sender@terminalA.ifax
MIME-Version: 1.0
Content-Type: multipart/mixed;
    boundary="RAA14128.773615768"
RAA14128.773615768
Content-type: image/tiff; application=faxbw
Content-Transfer-Encoding: base 64
[TIFF-FX Profile-F (Image Data)]
RAA14128.773615768

Furthermore, an example of an electronic mail message for the transmission of the delivery confirmation is shown in Chart 4. As it is evident from Chart 4, the delivery confirmation information is inserted at the head of the main body of the electronic mail message, and the ability information of the receiver (information such as a file format of the image data, a processable resolution and its horizontal to vertical ratio, an image encoding method, and information of the width of the printing paper size) is included at the end of the electronic mail.

[Chart 4]
An example of the electronic mail message for the transmission of the delivery confirmation
Date: Wed, Sep. 20, 1995 00:22:00+0900
From: Recipient@terminalB.ifax
Message-Id:<199509200022.12345@terminalB.ifax>
Subject: Re; Internet FAX Full Mode Sample 2
To: Sender@terminalA.ifax
MIME-Version: 1.0
Content-Type: multipart/report;
    report-type=disposition-notification;
    boundary="RAA14128.773615769"
RAA14128.773615769
The message sent on Sep. 20, 1995 at 00:21:00+0900 to Recipient@terminalB.ifax with subject "Internet FAX Full Mode Sample 2" has been processed in Internet FAX Full Mode.
RAA14128.773615769
Content-Type: message/disposition-notification
Reporting-UA: Recipient, terminalB.ifax; IFAX-FullMode
Original-Recipient: rfc822; Recipient@terminalB.ifax
Final-Recipient: rfc822; Recipient(terminalB.ifax
Original-Message-ID:<199509200021.12345@terminalA.ifax>
Disposition:    automatic-action/MDN-sent-automatically; processed
Media-Accept-Features:
  (&(color=Binary)
  (image-file-structure=TIFF)
  (|(&(dpi=200)(dpi-xyratio=200/100))
  (&(dpi=200)(dpi-xyratio=1))
  (&(dpi=400)(dpi-xyratio=1)))
  (|(image-coding=[MH,MR,MMR])
  (&(image-coding=JBIG)
  (image-coding-constraint=JBIG-T85)
  (JBIG-stripe-size=128)))
  (MRC-mode=0)
  (paper-size=[A4,B4])
  (ua-media=stationery))
RAA14128.773615769/terminalB.ifax FIG. 3 is a flowchart showing the full-mode Internet facsimile transmission processing that is executed by the main control unit 1 of the Internet facsimile machine 20 of FIG. 1.

Figure 3:
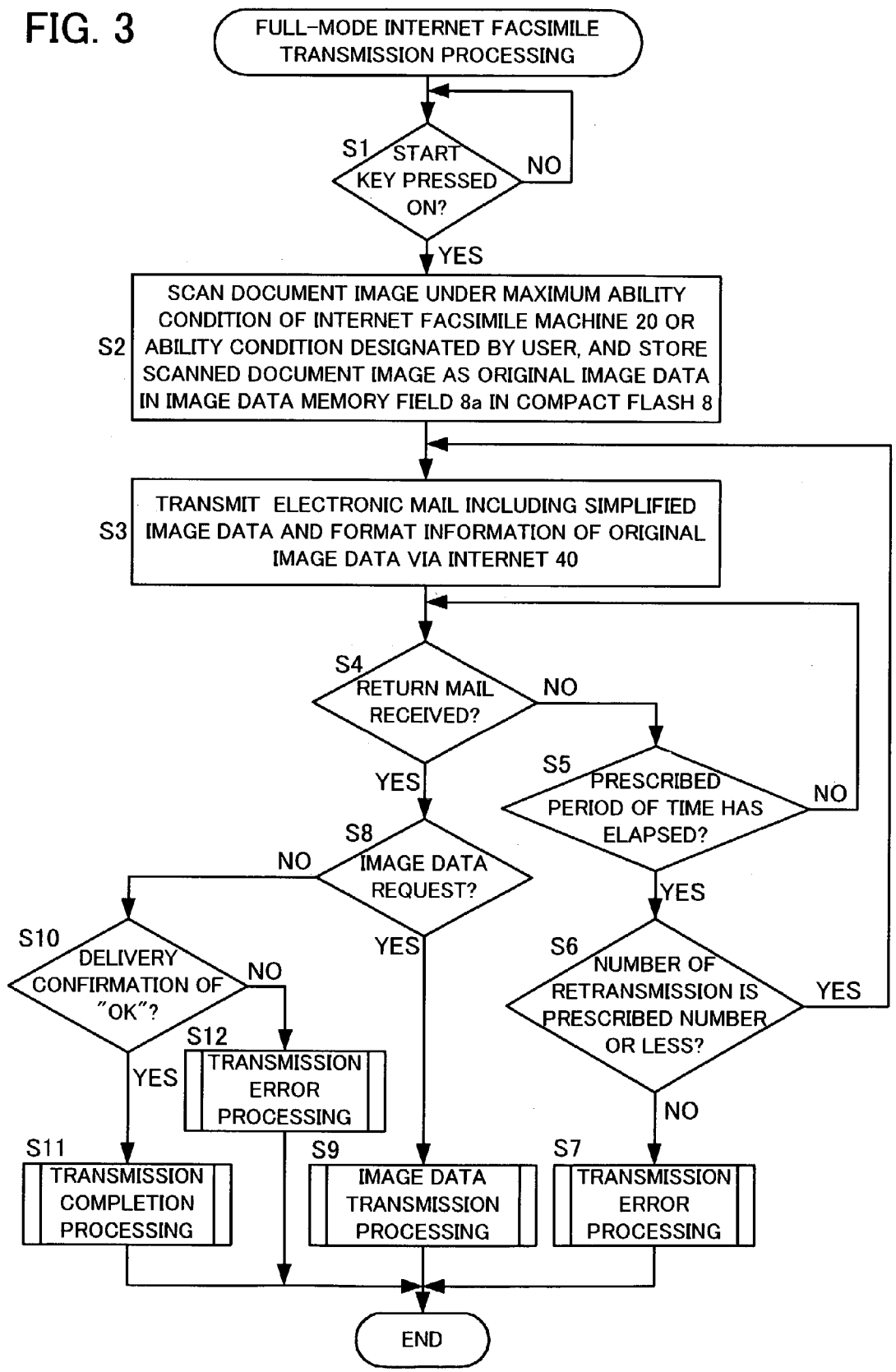
FIG. 3 is a flowchart showing a full-mode Internet facsimile transmission processing to be executed by a main control unit 1 of the Internet facsimile machine 20 of the first embodiment.

In step S1 of FIG. 3, first, it is determined whether or not a start key is pressed ON. Then, when it is determined YES, in step S2, a document image is scanned under the maximum ability condition of Internet facsimile machine 20 or under an ability condition designated by the user. In addition, the scanned image is stored in the image data memory field 8a in the memory device 8 as an original image data. In step S3, the electronic mail message including the simplified image data and the format information of the original image data is transmitted to the receiving Internet facsimile machine via the Internet 40. Next, in step S4, it is determined whether or not a return mail message is received from the receiving Internet facsimile machine. When it is determined NO, the process proceeds to step S5. When it is determined YES, the process proceeds to step S8. In step S5, it is determined whether or not a prescribed period of time (for example, 30 minutes) has elapsed. When it is determined NO, the process returns to step S4. When it is determined YES, the process proceeds to step S6. Next, in step S6, it is determined whether or not a number of retransmissions have reached a prescribed number (for example, 5 times) or less. When it is determined YES, the process returns to the step S3. When it is determined NO, the process proceeds to step S7. After executing the transmission error processing of FIG. 4 in step S7, the Internet facsimile transmission processing ends.

Moreover, in step S8, it is determined whether or not it is the image data requested. When it is determined YES, the process proceeds to step S9. When it is determined NO, the process proceeds to step S10. After executing the image data transmission processing of FIG. 6 in step S9, the Internet facsimile transmission processing ends. Meanwhile, in step S10, it is determined whether or not the return mail message is the delivery confirmation of "OK". When it is determined YES, the process proceeds to step S11. When it is determined NO, the process proceeds to step S12. After executing the transmission completion processing of FIG. 5 in step S11, the Internet facsimile transmission processing ends. Meanwhile, after executing the transmission error processing of FIG. 4 in step S12, the Internet facsimile transmission processing ends.

Figure 6:
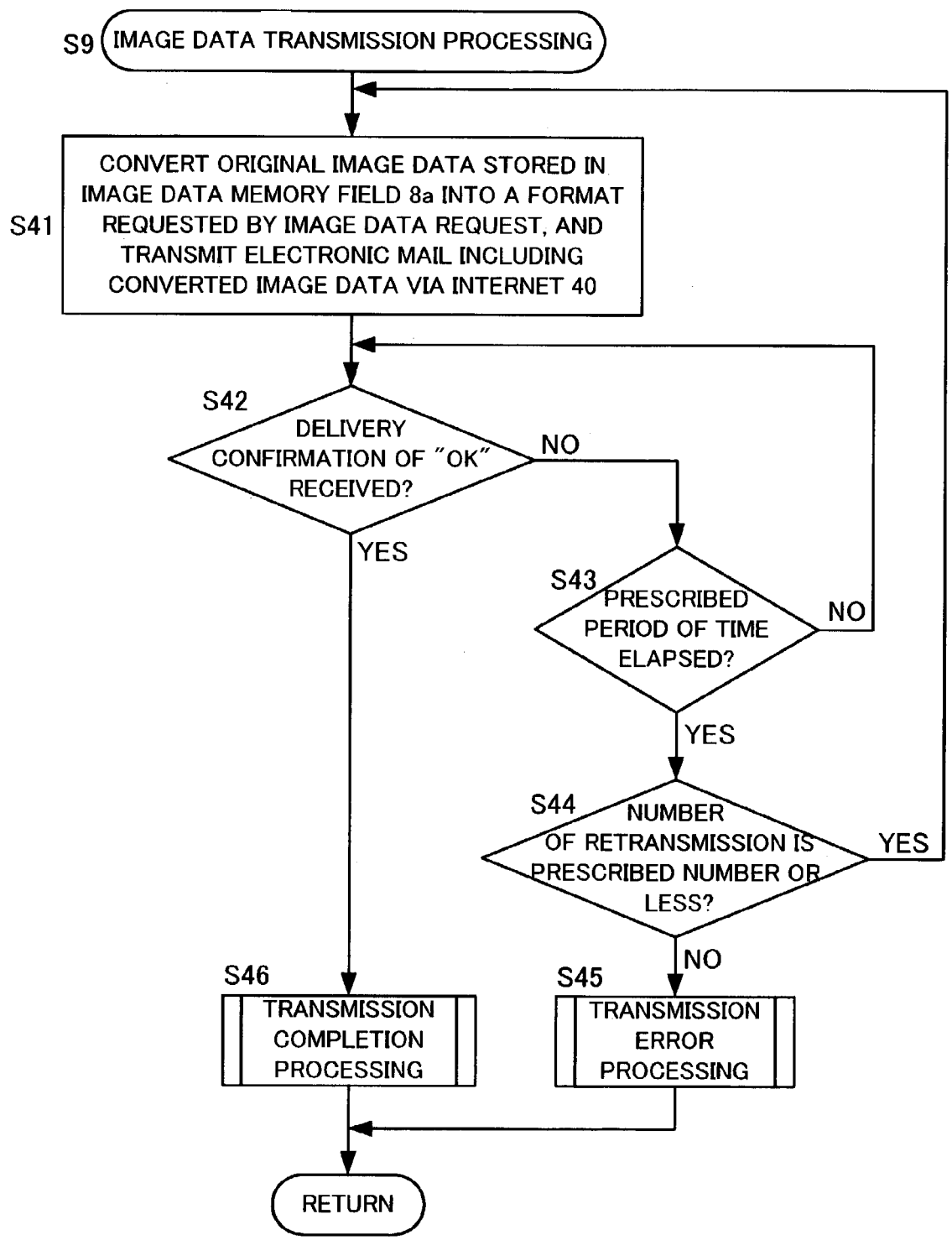
FIG. 6 is a flowchart showing an image data transmission processing (S9) which is a subroutine of FIG. 3.

FIG. 4 is a flowchart showing the transmission error processing (S7, S12, S45) which is a subroutine of FIG. 3 and FIG. 6.

In step S21 of FIG. 4, the original image data stored in the image data memory field 8a is deleted. Then, in step S22, when the return mail message cannot be received from the receiver, or when receiving the delivery confirmation of "NG", as described above, the transmission error report notifying a fact that the original image data has been deleted is printed out by using the image printing unit 3. In step S23, the transmission error is recorded in the communication management record table field 8b in the memory device 8, and the process returns to the original main routine.

Figure 5:
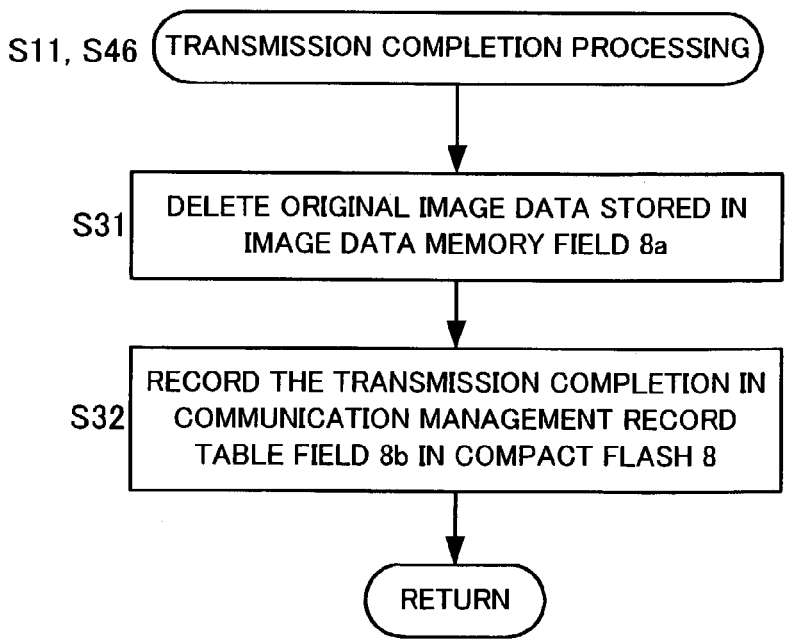
FIG. 5 is a flowchart showing a transmission completion processing (S11, S46) which is a subroutine of FIG. 3 and FIG. 6.

FIG. 5 is a flowchart showing the transmission completion processing (S11, S46) which is a subroutine of FIG. 3 and FIG. 6.

In step S31 of FIG. 5, first, the original image data stored in the image data memory field 8a is deleted. Then, in step S32, the transmission completion is recorded in the communication management record table 8b in the memory device 8, and the process returns to the original main routine.

FIG. 6 is a flowchart showing the image data transmission processing (S9) which is a subroutine of FIG. 3.

In step S41 of FIG. 6, first, the original image data stored in the image data memory field 8a is converted into a format requested by the image data request. Then, the electronic mail message including the converted image data is transmitted to the receiving Internet facsimile machine via the Internet 40. In step S42, it is determined whether or not the delivery confirmation of "OK" is received. When it is determined NO, the process proceeds to step S43. When it is determined YES, the process proceeds to step S46. In the step S43, it is determined whether or not a prescribed period of time (for example, 30 minutes) has elapsed. When it is determined NO, the process returns to the step S42. When it is determined YES, the process proceeds to step S44. In step S44, it is determined whether or not the number of retransmitting has a prescribed number (for example, 5 times) or less. When it is determined YES, the process returns to the S41. When it is determined NO, the process proceeds to step S45. After executing the transmission error processing of FIG. 4 in step S45, the process returns to the original main routine. Meanwhile, after executing the transmission completion processing of FIG. 5 in step S46, the process returns to the original main routine.

The full-mode Internet facsimile machine 20 transmits the simplified image data accompanying the information of the original document first. Then, when there is a request from the receiver, the Internet facsimile machine 20 retransmits the image data corresponding to the ability of the receiver. After the first transmission of the simplified image data, the system waits for some form of response from the receiver. However, a period of time for waiting for the response should not be limitless. Therefore, according to the first embodiment of the present invention, the period of time when the image data of the original document is held, and the number of retransmissions can be set, and the processing is carried out as follows.

(1) In the case there is no response even after a set period of time has elapsed, when the retransmission is set, the retransmission is carried out.

(2) Furthermore, in the case there is no response after carrying out the retransmission for a prescribed number of times, a transmission error is determined, the document being held is deleted, and the error processing is carried out, wherein for example, a check message is printed out.

As described above, according to the first embodiment, the full-mode Internet facsimile machine 20 stores the original image data in the image data memory field 8a in the memory device 8, and transmits the image data by using electronic mail via the Internet 40. After transmitting the first electronic mail message including the simplified image data (step S3 in FIG. 3), when the return electronic mail message cannot be received even after an elapsed prescribed period of time (NO in step S4 and YES in step S5), the main control unit 1 controls to retransmit the first electronic mail message (step S3). Therefore, by retransmitting the first electronic mail message, even when the electronic mail message transmitted first is undelivered, the return mail message can be expected. Accordingly, the storage period when the original image data is stored in the image memory can be shortened.

Moreover, after transmitting the second electronic mail message including the image data corresponding to the ability information of the receiver (step S41 in FIG. 6), when the return electronic mail message cannot be received even after an elapsed prescribed period of time (NO in step S42 and YES in step S43), the main control unit 1 controls to retransmit the second electronic mail message (step S41). Therefore, by retransmitting the second electronic mail message, even when the second electronic mail message transmitted at first is undelivered, the return mail message can be expected. Accordingly, the storage period when the original image data is stored in the image memory can be shortened.

Furthermore, when the return electronic mail message cannot be received even by retransmitting the electronic mail message for a prescribed number of times, by executing the transmission error processing of the step S7 or the step S45, the main control unit 1 deletes the original image data stored in the image data memory field 8a in the memory device 8 (step S21 in FIG. 4). In the transmission error processing, when the original image data is deleted, the main control unit 1 prints out such a fact (step S22), or records such a fact in the communication management record (step S23). Therefore, when the return electronic mail message cannot be received even by carrying out the retransmission, since the original image data is deleted, the storage field of the Internet facsimile machine 20 is not pressured continuously, and the storage period when the original image data is stored in the image memory can be shortened. Even when the original image data is deleted, since the deletion is recorded in the deletion report or the communication management record, the user of the transmitter can be aware of the deletion.

Furthermore, when the return electronic mail message cannot be received even by retransmitting the electronic mail message for a prescribed number of times, the main control unit 1 prints out a fact that a transmission error has occurred as the transmission error report (step S22 in FIG. 4). Therefore, when the return electronic mail message cannot be received even by carrying out the retransmission, since the transmission error is recorded by the transmission error report, the user of the transmitter can be aware of the transmission error.

Variation of First Embodiment

In the above-described first embodiment, an example of the Internet facsimile machine 20 is described. However, the present invention is not limited to this example, and for example, the present invention can be applied to a communication terminal device including a telephone set, a data communication device or the like, that is connected to a public network, such as a public switched telephone network or a public digital line network.

In the above-described first embodiment, when the return electronic mail message cannot be received even by retransmitting the electronic mail message for a prescribed number of times, the main control unit 1 prints out a fact that a transmission error has occurred as the transmission error report (step S22 in FIG. 4). However, the electronic mail message including the transmission error report can be transmitted to the receiving Internet facsimile machine, or to the Internet facsimile machine that is monitoring the Internet facsimile machine 20. Therefore, in the case the return electronic mail message cannot be received even by carrying out the retransmission, since the electronic mail message including the transmission error report is transmitted to the receiving Internet facsimile machine, or to the Internet facsimile machine that is monitoring the Internet facsimile machine 20, the user of these Internet facsimile machines can grasp the condition of the transmitter.

Second Embodiment

Next, the Internet facsimile machine 20 of the second embodiment of the present invention will be described with reference to the drawings. Further, since the control block configuration of the second embodiment is the same as the one shown in FIG. 1 that is used in the description for the first embodiment, the description will be abbreviated. Moreover, in the full-mode Internet facsimile machine 20 of the second embodiment, since the example of the electronic mail message for the transmission is the same as the one shown in Chart 1 through Chart 4 described in the first embodiment, the description will be abbreviated.

The Internet facsimile machine 20 of the second embodiment is a full-mode Internet facsimile machine that stores the original image data in the image data memory field 8a in the memory device 8, and then transmits the image data by using electronic mail via the Internet 40. The main control unit 1 detects a fact that the original image data has been erased from the image data memory field 8a in the memory device 8, under (a) a timing after the transmission of the first electronic mail message including the simplified image data (step S113 in FIG. 7), or
(b) a timing attempting to transmit the second electronic mail message including the image data corresponding to a prescribed ability information, when receiving the electronic mail message including the image data request for requesting the image data corresponding to the prescribed ability information after the transmission of the first electronic mail message including the simplified image data (step S147 in FIG. 10).

Figure 8:
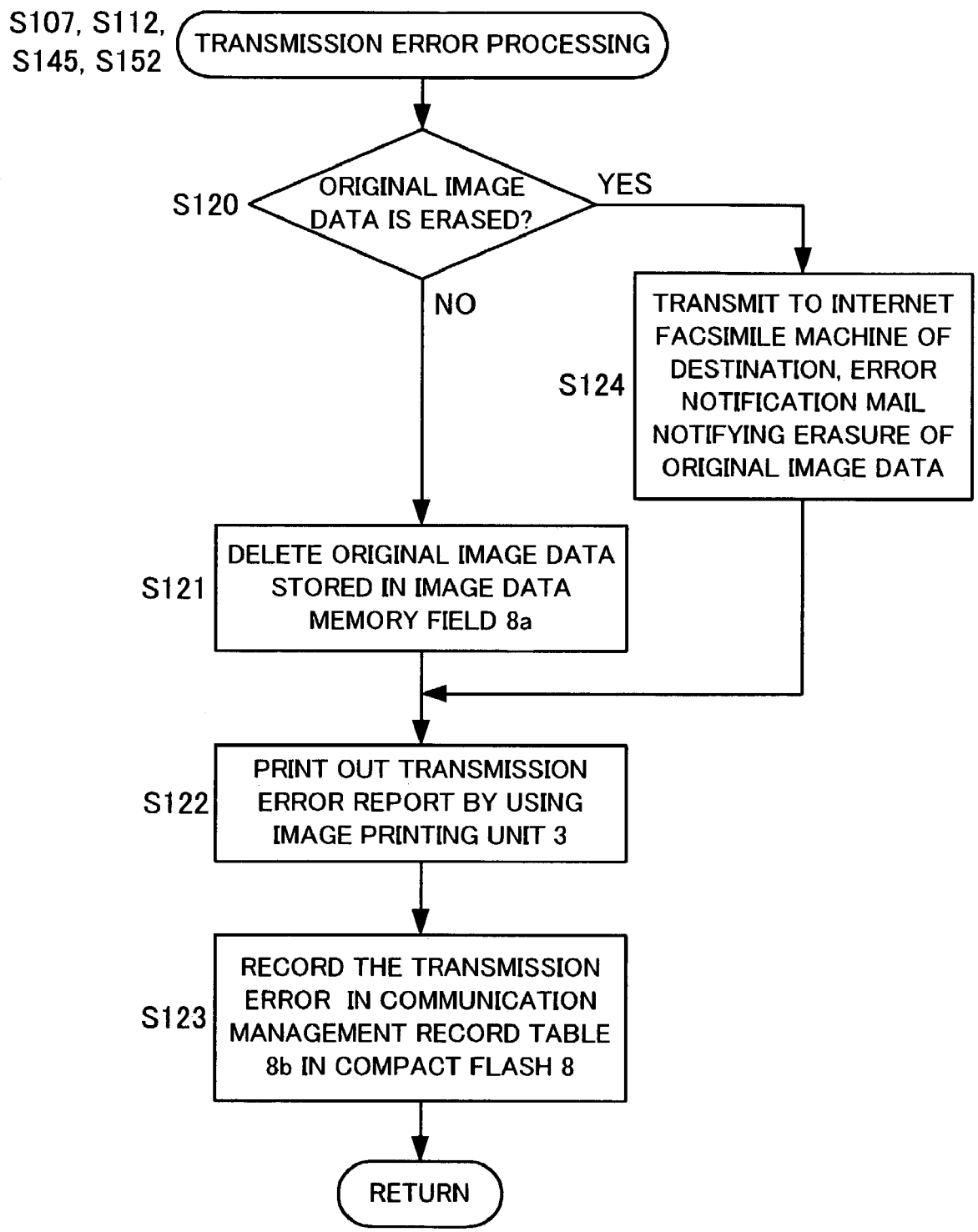
FIG. 8 is a flowchart showing a transmission error processing (S107, S112, S145, S152) which is a subroutine of FIG. 7, FIG. 10, and FIG. 11.

When the main control unit 1 detects the erasure of the original image data, the transmission error processing of FIG. 8 is executed. Under the transmission error processing,
(a) the fact that the erasure of the original image data is detected is notified to the receiving Internet facsimile machine by using electronic mail (step S124),
(b) the fact that the erasure of the original image data is detected is recorded in the communication management record (step S123), and
(c) the fact that the erasure of the original image data is detected is notified by printing out a report (step S122).

Moreover, according to the second embodiment, after the transmission of the first electronic mail message including the simplified image data, when receiving the electronic mail message (delivery confirmation) that does not request the image data corresponding to a prescribed ability information (NO in step S108 and YES in step S110), in the case the erasure of the original image data is detected (YES in step S130), a processing not making as an abnormality in the transmission completion, in other words, a processing to process as the transmission has completed normally, is executed.

Figure 7:
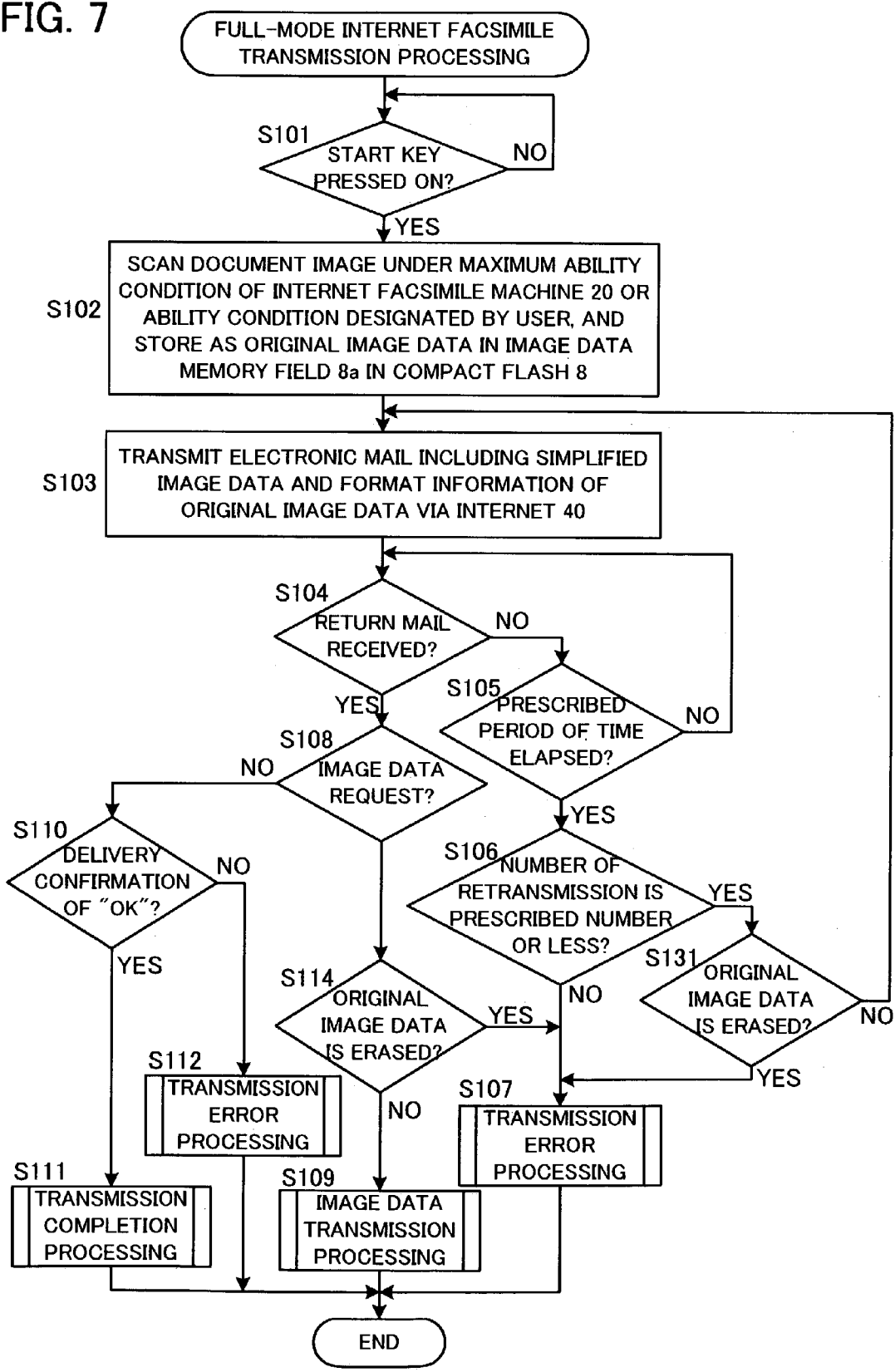
FIG. 7 is a flowchart showing a full-mode Internet facsimile transmission processing to be executed by the main control unit 1 of the Internet facsimile machine 20 of the second embodiment.

FIG. 7 is a flowchart showing the full-mode Internet facsimile transmission processing to be executed by the main control unit 1 of the Internet facsimile machine 20 of the second embodiment.

In step S101 of FIG. 7, it is determined whether or not the start key is pressed ON. When it is determined YES, in step S102, the document image is scanned under the maximum ability condition of Internet facsimile machine 20 or the ability condition designated by the user. In addition, the scanned image is stored in the image data memory field 8a in the memory device 8 as the original image data. In step S103, the electronic mail message including the simplified image data and the format information of the original image data is transmitted to the receiving Internet facsimile machine via the Internet 40. Next, in step S104, it is determined whether or not the return mail message has been received from the receiving Internet facsimile machine. When it is determined NO, the process proceeds to step S105. When it is determined YES, the process proceeds to step S108. In step S105, it is determined whether or not a prescribed period of time (for example, 30 minutes) has elapsed. When it is determined NO, the process returns to step S104. When it is determined YES, the process proceeds to step S106. Next, in step S106, it is determined whether or not a number of retransmittions have reached is a prescribed number (for example, 5 times) or less. When it is determined YES, the process proceeds to step S113. When it is determined NO, the process proceeds to step S107. In step S113, it is determined whether or not the original image data has been erased from the image data memory field 8a. When it is determined NO, the process returns to step S103. When it is determined YES, the process proceeds to step S107. Meanwhile, after the transmission error processing of FIG. 8 is executed in step S107, the Internet facsimile transmission processing ends.

Figure 9:
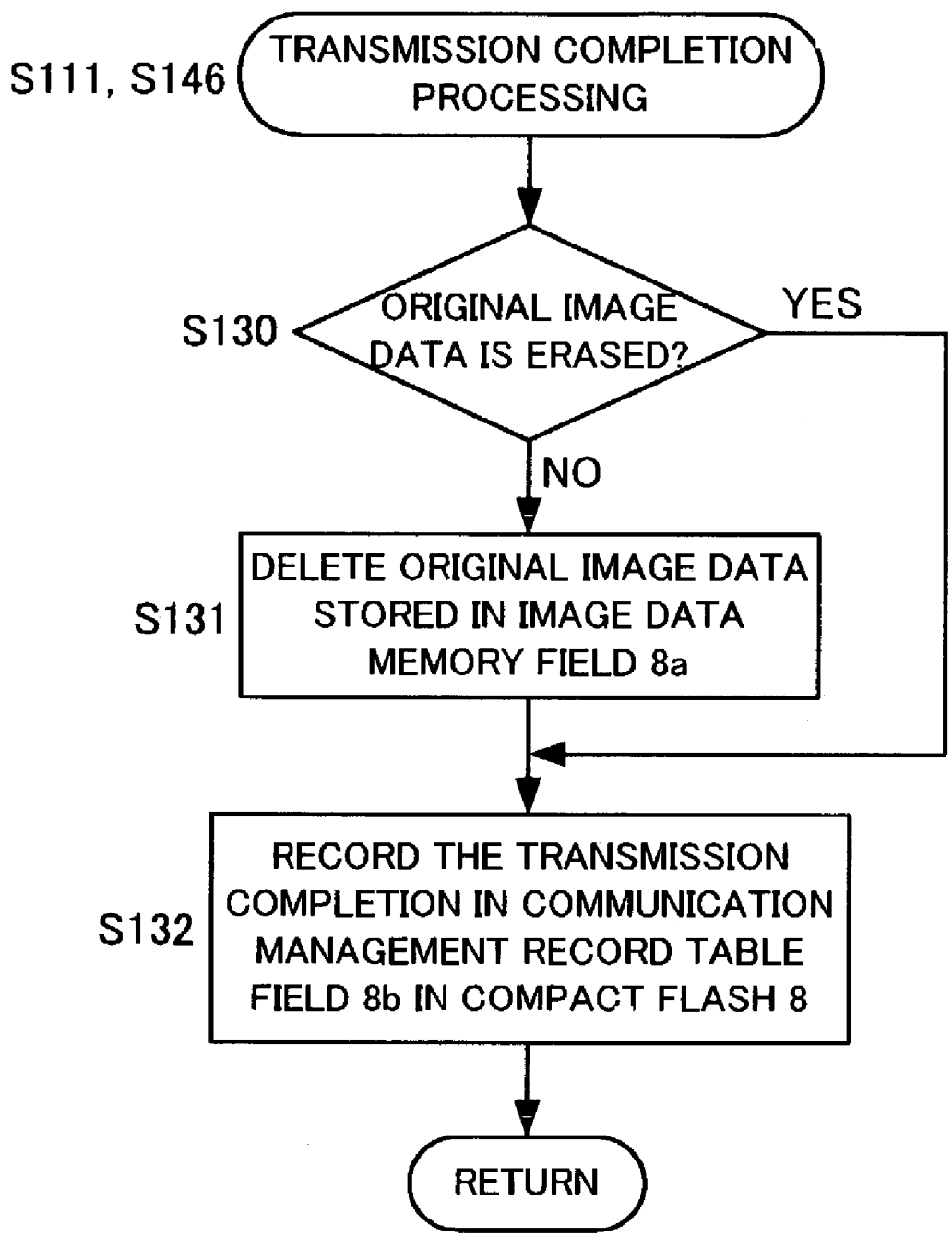
FIG. 9 is a flowchart showing a transmission completion processing (S111, S146) which is a subroutine of FIG. 7 and FIG. 10.
Figure 10:
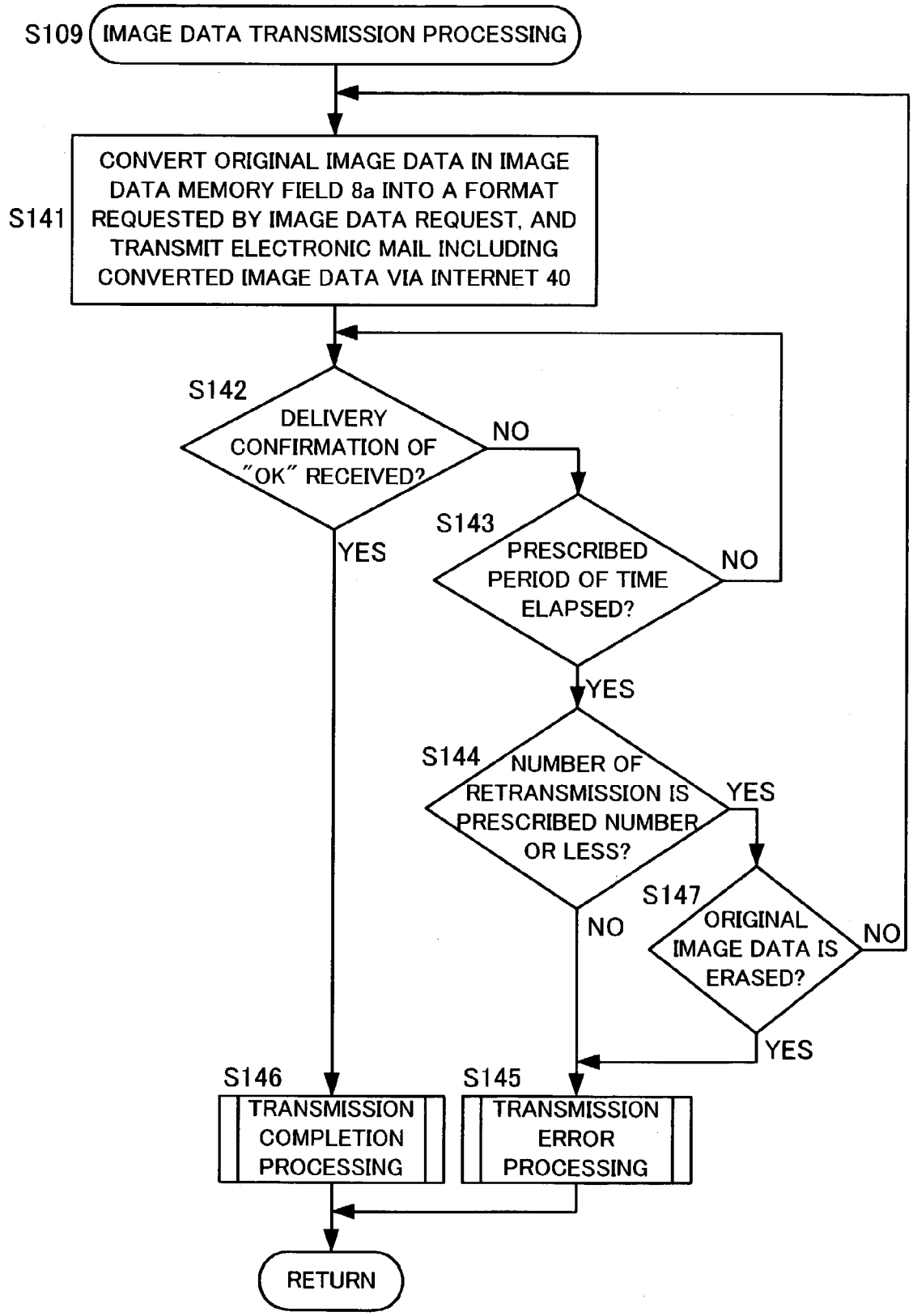
FIG. 10 is a flowchart showing an image data transmission processing (S109) which is a subroutine of FIG. 7.

In step S108, it is determined whether or not it is the image data requested. When it is determined YES, the process proceeds to step S114. When it is determined NO, the process proceeds to step S110. In step S114, it is determined whether or not the original image data has been erased from the image data memory field 8a. When it is determined NO, the process proceeds to step S109. When it is determined YES, the process proceeds to step S107. In step S109, the image data transmission processing of FIG. 10 is executed, and the Internet facsimile transmission processing ends. Meanwhile, in step S110, it is determined whether or not it is the delivery confirmation of "OK". When it is determined YES, the process proceeds to step S111. When it is determined NO, the process proceeds to step S112. In step S111, the transmission completion processing of FIG. 9 is executed, and the Internet facsimile transmission processing ends. Meanwhile, in step S112, the transmission error processing of FIG. 8 is executed, and the Internet facsimile transmission processing ends.

Figure 11:
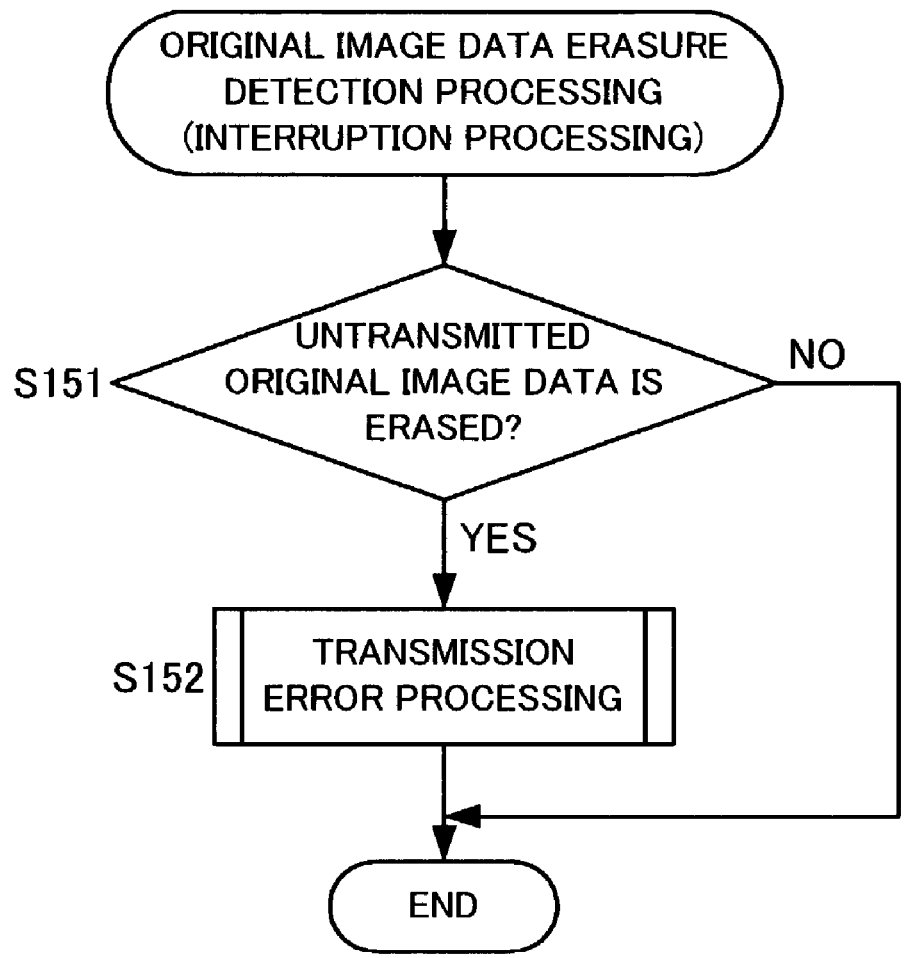
FIG. 11 is a flowchart showing an original image data erasure detection processing according to a variation of the second embodiment, which is executed by an interruption processing by the main control unit 1 of the Internet facsimile machine 20 of the second embodiment.

FIG. 8 is a flowchart showing the transmission error processing (S107, S112, S145, S152) which is the subroutine of FIG. 7, FIG. 10, and FIG. 11.

In step S120 of FIG. 8, it is determined whether or not the original image data has been erased from the image data memory field 8a. When it is determined NO, the process proceeds to step S121. When it is determined YES, the process proceeds to step S124. In step S124, an error notification mail notifying the erasure of the original image data is transmitted to the receiving Internet facsimile machine via the Internet 40. Then, the process proceeds to step S122. Meanwhile, in step S121, the original image data stored in the image data memory field 8a is deleted. In step S122, when the return mail message cannot be received from the receiver, or when the delivery confirmation of "NG" is received, as described above, the transmission error report notifying of the erasure of the original image data is printed out by using the image printing unit 3. Then, in step S123, the transmission error is recorded in the communication management record table field 8b in the memory device 8, and the process returns to the original main routine.

FIG. 9 is a flowchart showing the transmission completion processing (S111, S146) which is a subroutine of FIG. 7 and FIG. 10.

In step S130 of FIG. 9, it is determined whether or not the original image data has been erased from the image data memory field 8*a*. When it is determined NO, the process proceeds to step S131. When it is determined YES, to execute the processing not to make as an abnormality in the transmission completion, the process proceeds to step S132. In step S131, the original image data stored in the image data memory field 8*a* is deleted. In the step S132, the transmission completion is recorded in the communication management record table field 8*b* in the memory device 8, and the process returns to the original main routine.

FIG. 10 is a flowchart showing the image data transmission processing (S109) which is a subroutine of FIG. 7.

In step S141 of FIG. 10, the original image data in the image data memory field 8*a* is converted into a format requested by the image data request. The electronic mail message including the converted image data is transmitted to the receiving Internet facsimile machine via the Internet 40. In step S142, it is determined whether or not the delivery confirmation of "OK" is received. When it is determined NO, the process proceeds to step S143. When it is determined YES, the process proceeds to step S146. In step S143, it is determined whether or not a prescribed period of time (for example, 30 minutes) has elapsed. When it is determined NO, the process returns to the step S142. When it is determined YES, the process proceeds to step S144. In step S144, it is determined whether or not the number of retransmissions has reached a prescribed time (for example, 5 times) or less. When it is determined YES, the process proceeds to step S147. When it is determined NO, the process proceeds to step S145. In step S147, it is determined whether or not the original image data has been erased from the image data memory field 8*a*. When it is determined NO, the process returns to the step S141. When it is determined YES, the process proceeds to step S145. In step S145, the transmission error processing of FIG. 8 is executed, and the process returns to the original main routine. Meanwhile, in step S146, the transmission completion processing of FIG. 9 is executed, and the process returns to the original main routine.

The full-mode Internet facsimile machine transmits the simplified image data accompanying the image data information of the original document. Then, the full-mode Internet facsimile machine transmits the image data corresponding to the ability of the receiver if there is a request from the receiver. After the first transmission of the simplified image data, the system waits for some response from the receiver. During this period of time, in the case the original document being held is deleted due to some circumstance, the following processing is carried out.

(1) It is considered as a normal end (not to make as an abnormal end) in the case a prescribed period of time has occurred and the delivery confirmation is returned from the receiver (YES in step S130 in FIG. 9).

(2) In the case a prescribed period of time has occurred, and the image data request is returned that shows the transmission request of the original image data of the original document (YES in step S108, YES in Step S114), the electronic mail message showing the error is returned to the receiver, and the transmission error processing such as printing out the check message is executed (step S107).

(3) In the case the response is not returned even after an elapsed prescribed period of time (YES in step S105), the electronic mail message of error notifying the fact of deletion is returned to the receiver (step S107).

(4) In the case the response is not returned even after an elapsed prescribed period of time (YES in step S105), the transmission error processing such as printing out the check message is executed (step S107).

As described above, according to the second embodiment, the main control unit 1 detects that the original image data has been erased from the image data memory field 8*a* in the memory device 8 under (a) a timing after the transmission of the first electronic mail message including the simplified image data (step S113 in FIG. 7), or (b) a timing attempting to transmit the second electronic mail message including the image data corresponding to a prescribed ability information, when receiving the electronic mail message including the image data request for requesting the image data corresponding to the prescribed ability information after the transmission of the first electronic mail message including the simplified image data (step S147 in FIG. 10).

When the main control unit 1 detects the erasure of the original image data, the transmission error processing of FIG. 8 is executed. Under the transmission error processing, (a) the fact that the erasure of the original image data has been detected is notified to the receiving Internet facsimile machine by electronic mail (step S124), (b) the fact that the erasure of the original image data has been detected is recorded in the communication management record (step S123), and (c) the fact that the erasure of the original image data has been detected is notified by printing out a report (step S122).

Therefore, when the original image data is erased, an appropriate processing can be executed automatically, and in accordance with the notification of the erasure, the user can take appropriate measures at the transmitter and the receiver. Especially by the notification to the receiver, the reason for the interruption of the communication can be learned, and the user can take appropriate measures at the receiver.

Moreover, according to the second embodiment, after the transmission of the first electronic mail message including the simplified image data, when receiving the electronic mail message does not request the image data corresponding to the prescribed ability information (NO in step S108 and YES in step S110), in the case the erasure of the original image data has been detected (YES in step S130), the processing not making as the abnormality in the transmission completion is executed. Therefore, in such a case, it is not necessary to execute the error processing, the processing can be ended normally, and unnecessary processing is not executed.

Variation of Second Embodiment

In the above-described embodiment, an example of the Internet facsimile machine 20 is described. However, the present invention is not limited to this example, and can be applied to the communication terminal device including a telephone set, a data communication device or the like, that is connected to a public network such as the public switched telephone network or the public digital line network.

In the above-described second embodiment, when the return electronic mail message cannot be received even by retransmitting the electronic mail message for a prescribed number of times, the fact that the transmission error has occurred is printed out as a transmission error report (step S122 in FIG. 8). However, the present invention is not limited to this example, and for example, the electronic mail message including the transmission error report can be transmitted to the receiving Internet facsimile machine, or to the Internet facsimile machine monitoring the Internet facsimile machine 20. Therefore, when the return electronic mail message cannot be received even by carrying out the retransmission, since the electronic mail message including the transmission error report is transmitted to the receiving Internet facsimile machine, or to the Internet facsimile machine monitoring the Internet facsimile machine 20, the user of these Internet facsimile machines can grasp the condition of the transmitter.

FIG. 11 is a flowchart showing the original image data erasure detection processing of a variation of the second embodiment, which is executed by the interruption processing by the main control unit 1 of the Internet facsimile machine 20 of FIG. 1. This processing is executed as an interruption processing directly after when an untransmitted original image data is erased while the processing of the Internet facsimile machine 20 is monitored at all times. In FIG. 11, first in step S151, it is determined whether or not the untransmitted original image data has been erased from the image data memory field 8*a*. When it is determined NO, the interruption processing ends. When it is determined YES, in step S152, the transmission error processing of FIG. 8 is executed, and the interruption processing ends. In other words, in the variation of the second embodiment, when the untransmitted original image data has been erased from the image data memory field 8*a*, the following processing is executed.

(1) Without waiting for a prescribed period of time, the electronic mail message of an error notifying the deletion is returned immediately to the receiver (S124 within step S152).

(2) Without waiting for a prescribed period of time, the transmission error processing such as printing out the check message is executed immediately (for example, S122 within step S152).

Therefore, when the original image data has been erased, an appropriate processing can be executed automatically and immediately, and in accordance with the notification of the erasure, the user can take appropriate measures at the transmitter and the receiver. Especially by the notification to the receiver, the reason for the interruption of the communication can be learned, and the user can take appropriate measures at the receiver.

Furthermore, the full-mode Internet facsimile transmission processing of FIG. 7 through FIG. 10, and the interruption processing of FIG. 11 can be set selectively, for example, for each facsimile communication or for each destination. In other words, the first operation mode and the second operation mode can be set selectively. Further, the first operation mode detects the erasure of the original image data from the storage unit at all times, and executes a prescribed notification processing when the erasure has been detected. The second operation mode detects the erasure of the original image data from the storage unit under the prescribed timing, and executes the prescribed notification processing when the erasure has been detected. In this case, when the original image data has been erased, an appropriate processing can be executed automatically, for example, for each facsimile communication or for each destination. In addition, the user can take appropriate measures at the transmitter and the receiver in accordance with the notification of the erasure. Especially by the notification to the receiver, the reason for the interruption of the communication can be learned, and the user at the receiver can take appropriate measures.

What is claimed is:

1. An Internet facsimile machine, comprising:

means for transmitting image data by using an electronic mail message after storing original image data in a storage unit;

means for controlling to retransmit a first electronic mail message, when transmitting the first electronic mail message including simplified image data, and a return electronic mail message cannot be received even after an elapsed prescribed period of time; and means for detecting an erasure of the original image data when receiving an electronic mail message that does not request image data corresponding to prescribed ability information after the transmission of the first electronic mail message including simplified image data, wherein the means for controlling executes a processing not making an abnormality in a transmission completion when the erasure of the original image data has been detected.

2. An Internet facsimile machine, comprising:

means for transmitting image data by using an electronic mail message after storing original image data in a storage unit;

means for controlling to execute an image data transmission processing when receiving a return electronic mail message including ability information of a receiving Internet facsimile machine and image data requested before an elapsed prescribed period of time after transmission of a first electronic mail including simplified image data with a resolution lower than original image data and information of the original image data, and to retransmit the first electronic mail message when a return electronic mail message including ability information of the receiving Internet facsimile machine and an image data request cannot be received before an elapsed prescribed period of time after a transmission of the first electronic mail message including simplified image data with a resolution lower than an original image data and information of the original image data; and means for detecting an erasure of the original image data when receiving an electronic mail message that does not request image data corresponding to prescribed ability information after the transmission of the first electronic mail message including simplified image data, wherein the means for controlling executes a processing not making an abnormality in a transmission completion when the erasure of the original image data has been detected.

3. An Internet facsimile machine, comprising:

means for transmitting image data by using an electronic mail message after storing original image data in a storage unit;

means for controlling to retransmit a first electronic mail message, when transmitting the first electronic mail message including simplified image data, and a first return electronic mail message cannot be received even after an elapsed prescribed period of time, and to retransmit a second electronic mail message when a second return electronic mail message cannot be received after an elapsed prescribed period of time after a transmission of the second electronic mail including image data corresponding to an ability information of a receiving device; and means for detecting an erasure of the original image data when receiving an electronic mail message that does not request image data corresponding to prescribed ability information after the transmission of the first electronic mail message including simplified image data, wherein the means for controlling executes a processing not making an abnormality in a transmission completion when the erasure of the original image data has been detected.

4. An Internet facsimile machine, comprising:

means for transmitting image data by using an electronic mail message after storing original image data in a storage unit; and means for controlling to transmit as a second electronic mail message by forming from original image data, image data corresponding to ability information included in a return electronic mail message when receiving the return electronic mail message including ability information of a receiving Internet facsimile machine and an image data request before an elapsed prescribed period of time after a transmission of a first electronic mail message including simplified image data with a resolution lower than an original image data and an information of the original image data, and to retransmit the second electronic mail message when a return electronic mail message including a delivery confirmation indicating a normal reception cannot be received after an elapsed prescribed period of after the transmission of the second time electronic mail; message and means for detecting an erasure of the original image data when receiving an electronic mail message that does not request image data corresponding to prescribed ability information after the transmission of the first electronic mail message including simplified image data, wherein the means for controlling executes a processing not making an abnormality in a transmission completion when the erasure of the original image data has been detected.

5. The Internet facsimile machine according to claim 1, wherein the means for controlling deletes an original image data stored in a storage means when a return electronic mail message cannot be received even by retransmitting the electronic mail message for a prescribed number of times.

6. The Internet facsimile machine according to claim 5, wherein when the original image data has been deleted, the means for controlling prints out a fact that the original image data has been deleted.

7. The Internet facsimile machine according to claim 5, wherein when the original image data has been deleted, the means for controlling records a fact that the original image data has been deleted in a communication management record.

8. The Internet facsimile machine according to claim 1, wherein when a return electronic mail message cannot be received even by retransmitting the electronic mail message for a prescribed number of times, the means for controlling outputs a fact that a transmission error has occurred.

9. The Internet facsimile machine according to claim 8, wherein when a return electronic mail message cannot be received even by retransmitting the electronic mail message for a prescribed number of times, the means for controlling controls to print out a fact that a transmission error has occurred as a transmission error report.

10. The Internet facsimile machine according to claim 8, wherein when a return electronic mail message cannot be received even by retransmitting the electronic mail message for a prescribed number of times, the means for controlling controls to transmit an electronic mail message including a transmission error report.

11. An Internet facsimile machine, comprising:

means for transmitting image data by using an electronic mail message after storing original image data in a storage unit; and means for detecting that an original image data has been erased from a storage units; and means for controlling to execute a prescribed notification processing when an erasure of original image data has been detected, except when receiving an electronic mail message that does not request image data corresponding to prescribed ability information after transmission of a first electronic mail message including simplified image data, in which case the means for controlling executes a processing not making an abnormality in a transmission completion.

12. The Internet facsimile machine according to claim 11, wherein the means for detecting detects a fact that an untransmitted original image data has been erased from the storage unit.

13. The Internet facsimile machine according to claim 11, wherein the means for detecting detects the erasure of the original image data from the storage unit under a prescribed timing, and the timing is a timing after the transmission of a first electronic mail message including simplified image data.

14. The Internet facsimile machine according to claim 11, wherein after the transmission of a first electronic mail message including simplified image data, when receiving an electronic mail message of a delivery confirmation indicating a failure in a reception of the first electronic mail message from a destination before an elapse of a prescribed period of time, the means for controlling erases the original image data from the storage unit.

15. The Internet facsimile machine according to claim 11, wherein when a return electronic mail message cannot be received even after an elapsed prescribed period of time after a transmission of a first electronic mail message including a simplified image data, the means for controlling controls to retransmit the first electronic mail message, and when the retransmission processing is carried out for a prescribed number of times, the means for controlling erases the original image data from the storage unit.

16. The Internet facsimile machine according to claim 11, wherein the means for detecting detects that the original image data has been erased from the storage unit under a prescribed timing, and the timing is a timing to transmit a second electronic mail message including image data corresponding to ability information when receiving an electronic mail message including an image data request requesting image data corresponding to a prescribed ability information after a transmission of a first electronic mail including simplified image data.

17. An Internet facsimile machine, comprising:

means for transmitting image data by using an electronic mail message after storing original image data in a storage unit; and means for selectively setting and executing a first operation mode which detects that an original image data has been erased from a storage unit at all times and executes a prescribed notification processing when detecting the erasure of the original image data, except when receiving an electronic mail message that does not request image data corresponding to prescribed ability information after transmission of a first electronic mail message including simplified image data, in which case a processing not making an abnormality in a transmission completion is executed; and a second operation mode which detects that the original image data has been erased from the storage unit under a prescribed timing and executes a prescribed notification processing when detected the erasure of the original image data, except when receiving an electronic mail message that does not request image data corresponding to prescribed ability information after transmission of a first electronic mail message including simplified image data, in which case a processing not making an abnormality in a transmission completion is executed.

18. The Internet facsimile machine according to claim 11 wherein the notification processing is to notify the detection of the erasure of the original image data to a destination by using electronic mail.

19. The Internet facsimile machine according to claim 11 wherein the notification processing is to record the detection of the erasure of the original image data in a communication management record.

20. The Internet facsimile machine according to claim 11 wherein the notification processing is to notify the detection of the erasure of the original image data by printing out a report.

21. An Internet facsimile machine, comprising:
means for transmitting image data by using an electronic mail message after storing original image data in a storage unit; and
means for detecting an erasure of an original image data when receiving an electronic mail message that does not request image data corresponding to prescribed ability information after a transmission of a first electronic mail message including simplified image data; and
means for controlling to execute a processing not making an abnormality in a transmission completion when an erasure of the original data has been detected.

22. The Internet facsimile machine according to claim 21, wherein the electronic mail message that does not request an image data corresponding to a prescribed ability information is an electronic mail message of a delivery confirmation indicating a normal reception of a first electronic mail message including simplified image data, and that does not request an image data corresponding to a prescribed ability information.

23. An Internet facsimile machine, comprising:
a control unit controlling to transmit image data by using an electronic mail message after storing original image data in a storage unit, and to retransmit a first electronic mail message, when transmitting the first electronic mail message including simplified image data, and a return electronic email message cannot be received even after an elapsed prescribed period of time; and
a detection unit for detecting an erasure of the original image data when receiving an electronic mail message that does not request image data corresponding to prescribed ability information after the transmission of the first electronic mail message including simplified image data,
wherein the control unit executes a processing not making an abnormality in a transmission completion when the erasure of the original image data has been detected.

* * * * *